(12) United States Patent
Gopalam et al.

(10) Patent No.: US 12,719,401 B2
(45) Date of Patent: Aug. 25, 2026

(54) CLAMPING ASSEMBLY FOR MOUNTING SOLAR PANEL MODULES

(71) Applicant: Unirac, Inc., Albuquerque, NM (US)

(72) Inventors: Sindhu Madhavi Gopalam, Hyderabad (IN); Sai Vamsi Behara, Hyderabad (IN); Sai Nihar Yadav Godha, Hyderabad (IN)

(73) Assignee: Unirac, Inc., NM (US)

( * ) Notice: Subject to any disclaimer, the term of this patent is extended or adjusted under 35 U.S.C. 154(b) by 26 days.

(21) Appl. No.: 18/827,171

(22) Filed: Sep. 6, 2024

(65) Prior Publication Data

US 2025/0088136 A1 Mar. 13, 2025

Related U.S. Application Data

(60) Provisional application No. 63/537,427, filed on Sep. 8, 2023.

(51) Int. Cl.
*H02S 20/23* (2014.01)
*F16B 5/06* (2006.01)

(52) U.S. Cl.
CPC ............ *H02S 20/23* (2014.12); *F16B 5/0685* (2013.01)

(58) Field of Classification Search
CPC ................................ H02S 20/00; H02S 20/23
See application file for complete search history.

(56) References Cited

U.S. PATENT DOCUMENTS

2017/0033730 A1* 2/2017 Almy ...................... H02S 20/30
2019/0013772 A1* 1/2019 Bamat .................. F24S 25/636
2020/0313604 A1* 10/2020 Harris .................... F16B 2/065

* cited by examiner

*Primary Examiner* — Jason L Vaughan
*Assistant Examiner* — Amanda Kreiling
(74) *Attorney, Agent, or Firm* — Lee & Hayes, P.C.

(57) ABSTRACT

A clamp assembly for securing a solar panel module includes a base that secures to an attachment of a solar module mounting system. The base is connected to a clamp component through a vertical component that enables vertical adjustment of the clamp component relative to the base. The clamp component includes a bottom clamp and a top clamp that connect through a threaded connector and a spring to enable adjustment of a thickness to accommodate a range of solar panel modules. The top clamp further includes a connection interface for receiving a trim component that moves with positioning of the top clamp relative to the bottom clamp and the base.

20 Claims, 7 Drawing Sheets

140
136
138
102
132
104
106
104
106
134
130
128
116
110
108
110
124
122
112
126
118
114
120
100

800
802
816
118
120
814
108
104
102
806
808
810
812
804
132

900
124
902
904
906
908
120
118
108
102
104

1310
1300
1314
1312
1308
1318
1316
1320
1306
1304
1302
108
102
104
104

1402
1300
1310
1314
1404
1308
1318
1312
1316
1406
1320
1306
1304
108
1302
102
104
104

CLAMPING ASSEMBLY FOR MOUNTING SOLAR PANEL MODULES

RELATED APPLICATIONS

This application claims priority to U.S. Provisional Patent Application No. 63/537,427, filed on Sep. 8, 2023, the entire contents of which are incorporated herein by reference.

BACKGROUND

The solar industry is growing worldwide and, as a result, more efficient structures are desirable for mounting photovoltaic modules or solar panel modules to a structure, such as a roof of a home or other building. While different structures are known, there is a desire to reduce their complexity. Therefore, there is a need for improved equipment to mount solar panel modules.

BRIEF DESCRIPTION OF THE DRAWINGS

The detailed description is set forth with reference to the accompanying figures. In the figures, the left-most digit(s) of a reference number identifies the figure in which the reference number first appears. The use of the same reference numbers in different figures indicates similar or identical components or features. Furthermore, the drawings may be considered as providing an approximate depiction of the relative sizes of the individual components within individual figures. However, the drawings are not to scale, and the relative sizes of the individual components, both within individual figures and between the different figures, may vary from what is depicted. In particular, some of the figures may depict components as a certain size or shape, while other figures may depict the same components on a larger scale or differently shaped for the sake of clarity.

DETAILED DESCRIPTION

Figure 1:
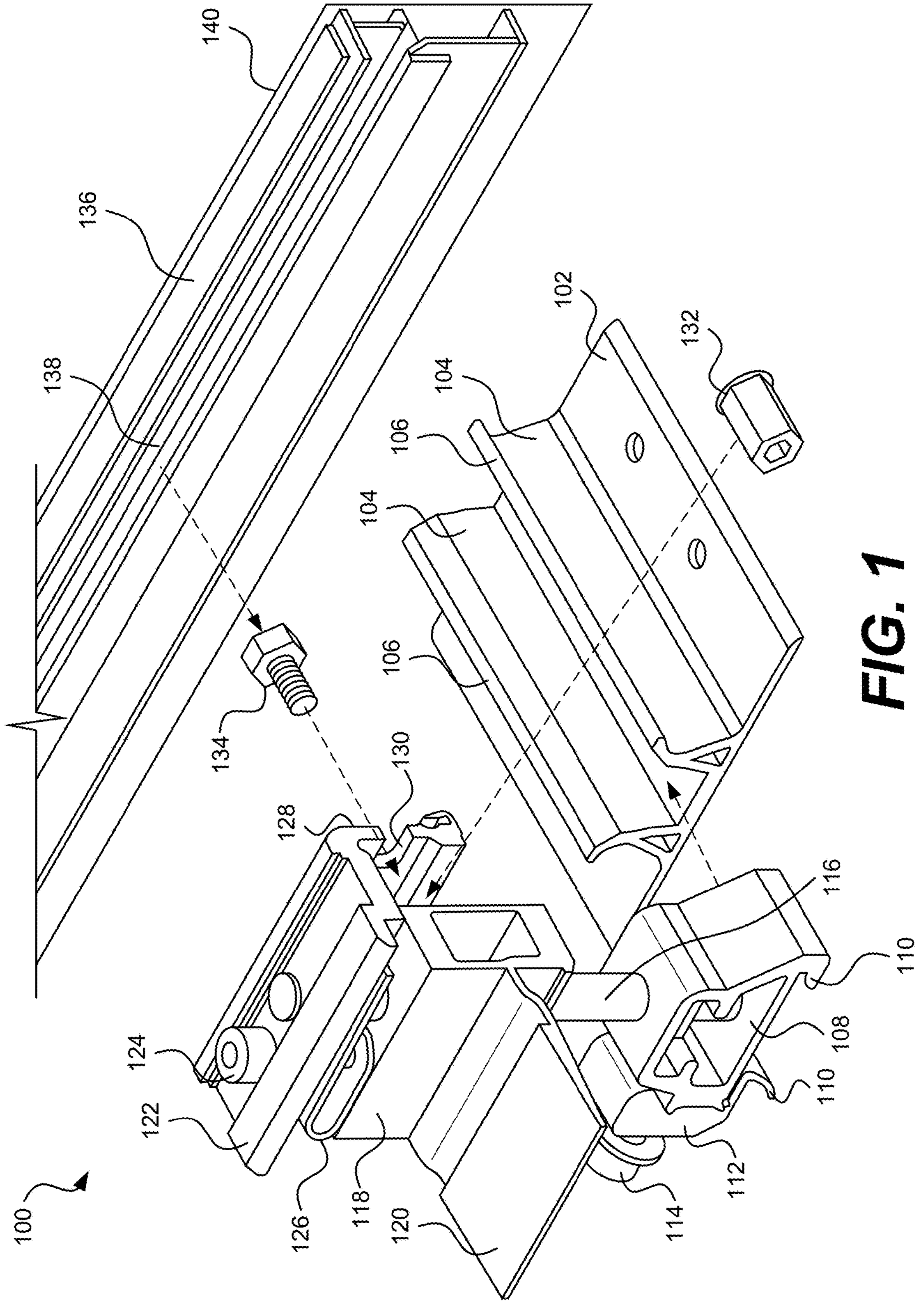
FIG. 1 illustrates an exploded view of a clamp assembly for connecting to an attachment, the clamp assembly used for mounting solar modules and trim components, according to an embodiment.

This application is directed, at least in part, to solar panel module installation, more specifically, to a clamping assembly for mounting solar panel modules to a mounting surface of a platform such as a rooftop or other structure.

The clamp system includes a mount that attaches (e.g., couples, secures, connects, etc.) to an attachment, and a connector that secures a solar panel module to the mount. The clamp system includes a base that connects to an attachment of the solar mount system, a vertical support, and clamp components including a top clamp and a bottom clamp that work together to hold a solar module from the side.

In an embodiment, the attachment of the solar panel module installation may be secured to a surface, such as a roof, on which the solar panel modules are disposed. For example, the attachment may be fastened (e.g., via screws, brackets, etc.) into the surface. Any number of attachments may be disposed on the surface, and any number of solar panel modules may be disposed across the attachments. In an embodiment, the solar panel modules may be supported, anchored, secured, etc. to two of the attachments. For example, the solar panel modules may be supported along one side by a first attachment and may be supported along a second side, opposite the first side, by a second attachment. In an embodiment, the solar panel modules may be supported at locations inboard of the solar panel modules, known as quarter points, or proximate to, corners of the solar panel modules.

In an embodiment, the base of the clamp system connects the clamp to an attachment that is connected to or mounted on a structure or surface. In particular, the base includes a base clamp that connects to protrusions of an attachment system to secure the clamp system in position along the attachment. By loosening the base clamp, the clamp system may be moved along the length of the attachment as needed for a particular installation. The base clamp is connected through a vertical support to a clamp component. The vertical support may provide height adjustment to change a vertical position of the clamp component with respect to the attachment.

The clamp may include a top clamp, bottom clamp, and a spring component. The top clamp may include an L-shaped clamp that is formed of an L-shaped extrusion that holds the solar module from a top edge of the side of the solar module. Unlike existing top clamps for securing solar modules, the clamp system provides for continuous adjustment across a range of heights. For example, the clamp system may be capable of adjusting across a range of thirty to forty millimeters to accommodate solar modules having a range of thicknesses. For example, the single clamp system may be used for solar modules thirty millimeters in thickness, thirty-two millimeters in thickness, thirty-five millimeters in thickness, thirty-eight millimeters in thickness, and forty millimeters in thickness all with a single clamp system. Accordingly, the clamp system may be used to replace a number of different clamp components in a typical clamp system that requires specific claims for solar modules of varying thicknesses. The L-shaped clamp has an upper horizontal portion that contacts the upper edge of the solar module at the edge thereof and also includes a vertical component on a side of the top clamp opposite from the portion of the top clamp that engages with the solar module. The vertical component may be used to secure a trim component, such as trim components that provide trim around an edge of a solar module installation for aesthetic and practical purposes.

The bottom clamp may include an extruded component with a body and a flange extending therefrom to form an L-shaped extrusion. The body receives a vertical support that enables height positioning of the bottom clamp relative to the attachment. The flange may include a holder arm that supports a bottom surface of the solar module at the edge.

In an embodiment, the bottom clamp and the top clamp are held together through a combination of a spring and a bolt. The bolt extends through the top clamp and into the body of the bottom clamp. The spring is positioned between the horizontal portion of the top clamp and a top portion of the bottom clamp. The spring is positioned to bias the top clamp away from the bottom clamp. The spring may be a leaf spring or other such spring that pushes against the top clamp to cause the top clamp to rest against the head of the bolt that extends through the top clamp and into the bottom clamp. Accordingly, the bolt may be tightened to change the distance between the flange of the bottom clamp and the horizontal portion of the top clamp. This adjustability enables the clamp system to accommodate solar modules in a range of thicknesses, for example in a range of at least thirty millimeters to forty millimeters.

The clamp system described herein provides for continuous height adjustment to receive and clamp against a variety of modules of varying thicknesses. The clamp system also enable positioning of trim components by connecting them to the top clamp and providing for the trim components to be non-structural trim components. The clamp system provides for simplification of clamping systems by accommodating a variety of solar modules without requiring different top or bottom clamp pieces. Accordingly, a manufacturer and/or retailer may simplify ordering and installation of a system by reducing the number and configurations of components to be manufactured and organized, sold, and/or installed.

As the trim components are connected with the top clamp, when the clamp assembly moves vertically, the trim moves with it, ensuring that the components of the attachment system and mount intended to be hidden behind the trim stays hidden, regardless of the module height. Furthermore, the top clamp includes a lip for supporting the trim component by sliding a lip or flange of the trim component into the lip of the top clamp, thereby enabling hands free placement and ease of positioning of the trim onto the attachment system before fastening to the top clamp with fasteners. Further still, alignment of clamps is achieved using the trim on the south side of the roof even before solar modules are placed, without the use of a string aligner or other aligning tool that aids in installation processes and simplifies the installation for an installer.

In an embodiment, the clamp may be considered a "south clamp," where south is understood in the industry to represent an orientation along a solar panel module to position the solar panel module for ideal sunlight. For example, the clamp may be disposed on the south side of the solar panel module. Additional, mounts, clamps, brackets, etc. may be disposed on a north side of the solar panel module, where such mounts, clamps, brackets, etc. may be considered a "north mount," "north clamp," and so forth. However, although a particular orientation is described, other orientations and/or positions of the clamp are envisioned.

Although a particular engagement between the mount and the connector is described, other variations are envisioned. For example, the mount and/or the connector may include other features, channels, fasteners, etc. that engage to maintain an alignment, orientation, etc. between the mount and the connector. In an example, carriage bolts, flat-sided bolts, flat-sided bushings, etc. may be used to resist rotation of the connector while the fastener is fastened and/or unfastened. In these instances, the mount and/or the connector may include suitable components for engaging or receiving such components. The clamp may also be used with other brackets, mounts, etc., in addition to or alternative from the attachment that attaches to the surface.

In an embodiment, the clamp may be formed from any suitable materials, such as metal, composites, plastic, etc. In an embodiment, the mount may be formed from a piece of metal (e.g., steel, aluminum, etc.) that is stamped, bent, etc. to form the base, first flange, second flange, lip, etc. Post-processing techniques, for example, drilling may form through holes, channels, slots, etc. In an embodiment, the connector may be formed via extrusion, injection molding, die casting, etc. Post-processing techniques, for example, milling may form the lip, holes for the pins, and so forth.

The present description provides an overall understanding of the principles of the structure, function, device, and system disclosed herein. One or more examples are illustrated in the accompanying drawings. Those of ordinary skill in the art will understand that the devices and/or the systems specifically described herein and illustrated in the accompanying drawings are non-limiting embodiments. The features illustrated or described in connection with one embodiment may be combined with the features of other embodiments. Such modifications and variations are intended to be included within the scope of the appended claims.

In a first illustrative embodiment, the systems described herein provide a mounting system for mounting a solar panel module to a structure. The mounting system includes an attachment with a connection interface extending along a length of the attachment. The system also includes a base configured to connect to the connection interface and a vertical support coupled to the base. The system further includes a clamp assembly with a bottom clamp connected to and positionable along a height of the vertical support and a top clamp positionable relative to the bottom clamp along an axis parallel with the vertical support, the top clamp and bottom clamp configured to releasably secure an edge of the solar panel module. The system also includes a spring positioned between the bottom clamp and the top clamp.

In the first illustrative embodiment, the top clamp may include a top ledge positioned on a first side of the top clamp, the top ledge configured to rest against a top edge of a frame of the solar panel module. The top clamp further may also include a vertical component positioned on a second side opposite the first side, the vertical component having include a trim connection interface configured to receive a securing device of a trim component. The trim connection interface may include a passage defined in the vertical component to receive a bolt coupleable to the trim component and securable to the trim connection interface by a nut. The bottom clamp further includes a panel support ledge configured to support a bottom edge of a frame of the solar panel module. The spring may include a compression spring such as a leaf spring configured to apply a force in a first direction to separate the bottom clamp and the top clamp. The top clamp may include first alignment features and the bottom clamp may include second alignment features, the first alignment features and second alignment features may include protrusions configured to maintain the spring in an intended orientation. The base may include a first protrusion and a second protrusion configured to engage the connection interface.

In a second illustrative embodiment, the systems described herein provide a mounting system for mounting a solar panel module. The mounting system includes a plurality of attachments and a plurality of clamp assemblies attached to the plurality of attachments, where a clamp assembly of the plurality of clamp assemblies includes a base configured to connect one of the plurality of attachments. The clamp assembly also includes a vertical support coupled to the base, a bottom clamp connected to and positionable along a height of the vertical support, a top clamp positionable relative to the bottom clamp along a direction parallel with the height of the vertical support, the top clamp and bottom clamp configured to releasably secure an edge of the solar panel module adjacent a first side of the clamp assembly, and a spring configured to bias positioning of the top clamp relative to the bottom clamp.

In the second illustrative embodiment, the bottom clamp may include a panel support ledge that extends in a first direction substantially perpendicular to the vertical support. The top clamp may include a top support ledge that extends in the first direction. The top clamp may include a trim connection interface configured to receive a connection component. The connection component may include a fastener having a component configured to fit within a channel of the extruded attachment. The top clamp may include a first extruded attachment may include: an upper attachment may include a top support ledge, and where the spring is positioned between the bottom clamp and the upper attachment; and a side attachment extending substantially perpendicular to the upper attachment and defining a passage configured to receive a bolt coupleable to a trim component. The side attachment may include a trim support, the trim support may include a clip configured to receive a portion of a trim component and support the trim component adjacent a second side of the clamp assembly. The top clamp may include a trim interface, the mounting system may include: a trim component configured to connect to the trim interface and position the trim component adjacent a second side of the clamp assembly, the second side opposite the first side. The vertical support may include a height adjustment component configured to enable adjustment of a distance between the base and the bottom clamp. The top clamp is secured to the bottom clamp through an interface including: one or more first teeth on a first surface of the bottom clamp; one or more second teeth on a second surface of the top clamp; and a connector configured to pass through the first surface and the second surface, where the spring contacts the connector and is configured to bias the one or more first teeth into engagement with the one or more second teeth.

In a third illustrative embodiment, the present description provides a method of mounting a solar panel module to a structure via a clamp assembly. The clamp assembly includes a base, a vertical support coupled to the base, a bottom clamp connected to and positionable along a height of the vertical support, a top clamp positionable relative to the bottom clamp along a direction parallel with the height of the vertical support, the top clamp and bottom clamp configured to releasably secure an edge of the solar panel module adjacent a first side of the clamp assembly, and a spring configured to bias positioning of the top clamp relative to the bottom clamp. The method includes connecting the base to an attachment connected to the structure and placing a frame of the solar panel module on the bottom clamp adjacent a first side of the clamp assembly. The method further includes securing the top clamp against the frame of the solar panel module by positioning the top clamp relative to the bottom clamp. In the third illustrative embodiment, the method may include connecting a trim component to the top clamp through a trim interface, the trim component positioned adjacent a second side of the clamp assembly. In the third illustrative embodiment, the trim may be placed in a receiver of the top clamp, the receiver configured to hold the trim in position while fasteners are secured between the trim and the top clamp. To bolt the trim to the top clamp, the length of the horizontal component of the top clamp extends beyond the body of the bottom clamp (e.g., towards the side opposite a solar module receiving portion). A hole in the top clamp (e.g., an elongated hole) provides access to a T-slot in the trim component for a fastener to connect the trim to the top clamp with a head of a bolt in the T-slot and a nut secured behind the vertical portion of the top clamp to receive a threaded portion of the bolt.

FIG. 1 illustrates an exploded view of a clamp assembly 100 for connecting to an attachment 102, the clamp assembly 100 used for mounting solar modules and trim components, according to an embodiment. The attachment 102 includes flanges 104 with connection interfaces 106. The flanges extend from a base of the attachment 102 substantially perpendicular to the attachment 102. The connection interfaces 106 angle away from each other such that the connection interfaces 106 are farther apart as the distance from the base of the attachment 102 increases. The shape of the connection interfaces 106 provides for connecting a base 108 of the clamp assembly 100 along a length of the attachment 102. Though only a small portion of the attachment 102 is shown, the attachment may be of any length in a particular installation. Accordingly, the clamp assembly 100 may be positioned at any position along the length as needed for a particular installation.

The base 108 may include a connection interface 110 that is configured to mate with the connection interface 106 with a clamping portion 112 secured by a threaded fastener 114 to tighten the connection interface 110 about the connection interface 106 and releasably secure the base 108 to the attachment 102. The base 108 may have a vertical support 116 extending upward, the vertical support including a threaded rod or bolt or threaded connector to enable vertical positioning of the bottom clamp 118.

In an embodiment, the base 108 may further include inwardly-extending, tapered flanges formed, respectively, at distal edges of the first and second sides of the base. Moreover, the tapered flanges may be disposed on respective ends of the base 108, opposite the ends in which mounting openings are located. The tapered flanges may be tapered gradually increasing inwardly to ensure the clamp assembly 100 engages sidewalls of the attachment 102 when mounted on the attachment 102 and rotated against the attachment 102. An advantage of the tapered flange may include minimizing or even eliminating a tendency for the clamp assembly 100 to wobble on the attachment.

In an embodiment, the base 108 may have one or more openings (such as slotted apertures through the thickness direction thereof) such that the threaded fastener 114 (such as a flanged bolt or another like fastener) may be inserted and slidably accommodated therein to connect the base 108 and the clamping portion 112.

The bottom clamp 118 may have an L-shaped structure with a body and a panel support 120. The bottom clamp 118 may be formed of folded sheet metal or extruded metal. Other suitable materials and means of formation are within the scope of this disclosure, such as a molded plastic or other material, assuming the requisite strength and durability characteristics are ensured. Nevertheless, in an embodiment, the bottom clamp 118 includes a panel support 120 connected to a body of the bottom clamp 118. The panel support 120 extends from and transversely to the body of the bottom clamp 118. The panel support 120 is positioned to abut an outside wall of the frame of a solar panel module during installation. Additionally, a width of the panel support 120 extends in a plane that is orthogonal to the body of the bottom clamp and extends at an angle ranging from 25 to 100 degrees, or more, relative to the body of the bottom clamp 118.

In an embodiment, the top clamp 122 includes an L-shaped component that may be formed of an extruded metal or bent metal component having a horizontal portion and a vertical portion. The horizontal portion includes a ledge for contacting an outside wall of the frame of a solar panel module at a first edge of the top clamp 122.

The top clamp 122 may connect to the bottom clamp 118 through a threaded connector 124. The threaded connector 124 may pass through an opening in the top clamp 122 and a head of the threaded connector 124 is too large to fit through the opening of the top clamp 122. The threaded connector 124 threads into the body of the bottom clamp 118 to change a distance between the top clamp 122 and the bottom clamp 118. A spring 126 positioned between the top clamp 122 and the bottom clamp 118 biases the top clamp 122 away from the bottom clamp 118 and provides force against tightening the threaded connector 124. The spring 126 may be a leaf spring or other similar spring that provides a force to separate the top clamp 122 and the bottom clamp 118. Therefore, a gap between the ledge of the top clamp 122 and the panel support 120 may be increased or decreased by tightening or loosening the threaded connector 124. Additionally, the vertical support 116 may extend through the bottom clamp 118 and the top clamp 122, though the vertical support 116 may not be threaded into the top clamp 122 and may instead provide for alignment of the top clamp 122 with the bottom clamp 118 as the top clamp is tightened around a solar panel module.

In an embodiment, the top clamp 122 extends horizontally from the edge that contacts the solar panel module to a vertical component 128 that is offset from the body of the bottom clamp 118 to create a space between the vertical component 128 and the bottom clamp for a nut 132 to fit.

The vertical component 128 of the top clamp 122 provides an interface for connecting a trim component 136 to the top clamp 122. The vertical component 128 defines an opening 130 through which a bolt 134 passes with a nut 132 on an inner portion of the top clamp 122. The trim component 136 includes a channel 138 such as a T-slot that receives a head of the bolt 134. The trim component 136 includes an outer trim fascia 140 for covering portions of the mounting system.

Figure 3:
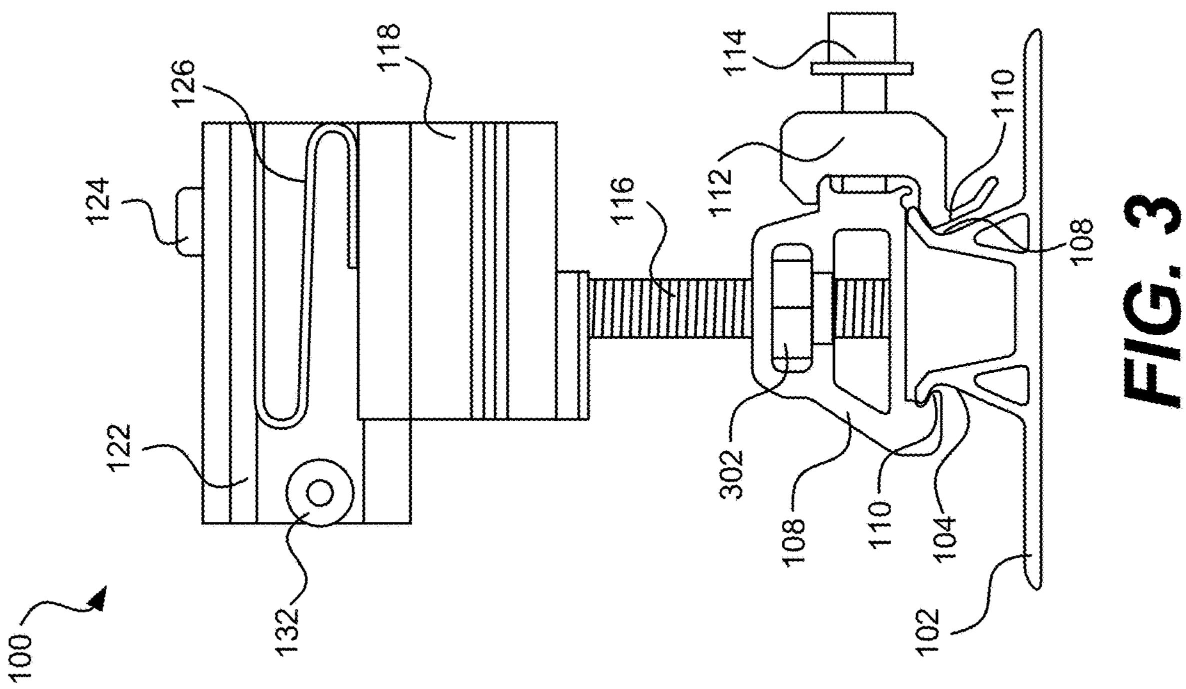
FIG. 3 illustrates a second side view of the clamp assembly as depicted in FIG. 1, according to an embodiment.
Figure 2:
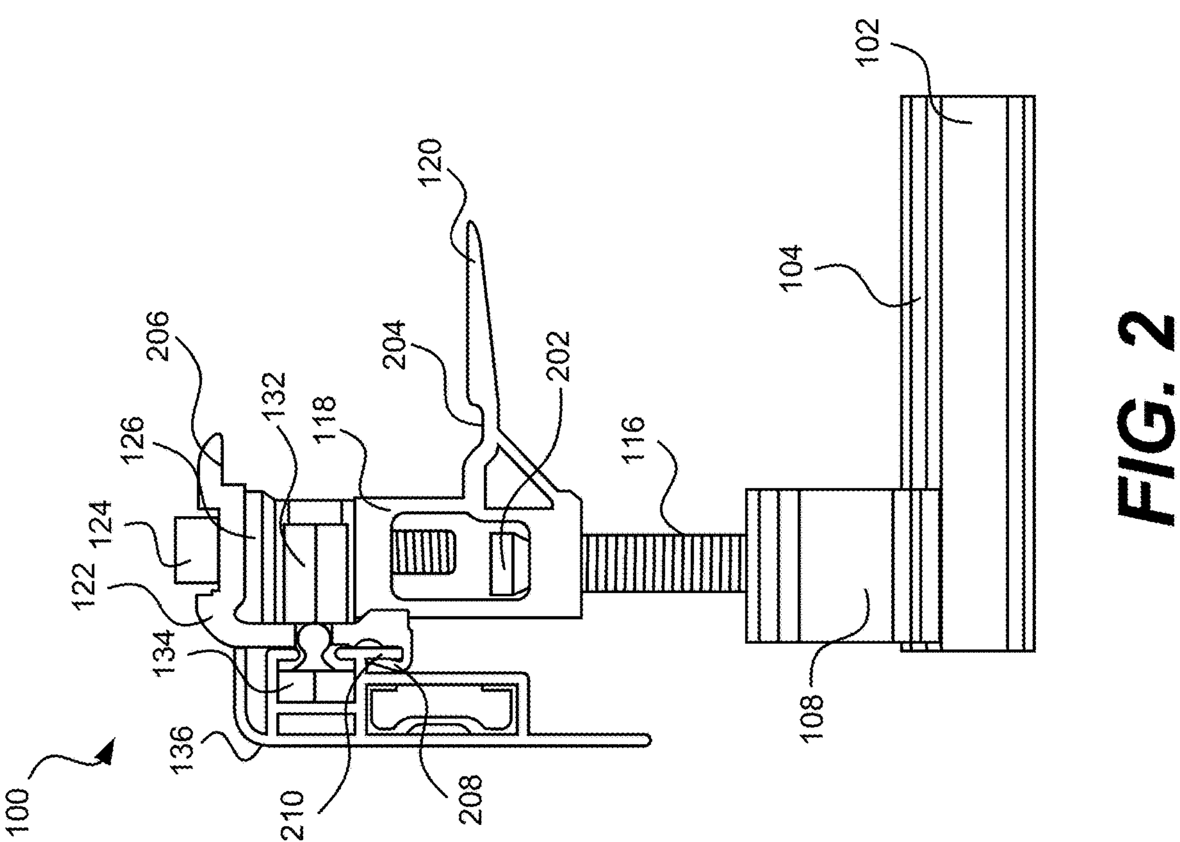
FIG. 2 illustrates a first side view of the clamp assembly as depicted in FIG. 1, according to an embodiment.

FIGS. 2-3 illustrate views of the clamp assembly 100 of FIG. 1. In particular, FIG. 2 illustrates a first side view of the clamp assembly 100 as depicted in FIG. 1, according to an embodiment. FIG. 3 illustrates a second side view of the clamp assembly 100 as depicted in FIG. 1, according to an embodiment. The views depicted in FIGS. 2-3 include the components shown and described with respect to FIG. 1, including the attachment 102, base 108, vertical support 116, bottom clamp 118, panel support 120, top clamp 122, threaded connector 124, spring 126, nut 132, bolt 134, trim component 136, and other such components as described herein. The clamp assembly 100 further includes a bolt head 202 that connects through the bottom clamp 118 to the vertical support 116. As depicted in FIG. 3, the height of the bottom clamp 118 is adjustable by turning a nut 302 threaded onto the vertical support 116 and captive within the base 108. The turning of the nut 302 moves the bottom clamp 118 vertically along an axis parallel with a length of the vertical support 116.

The clamp assembly 100 of FIGS. 2-3 further depicts a channel 204 defined within the panel support 120. The channel 204 may interface with an edge of a frame of the solar panel module to secure the solar panel module in place in the clamp assembly 100. The surface 206 of the top clamp 122 contacts an opposite side of the solar panel module to clamp the solar panel module in place.

Figures 4, 5, 6, 7:
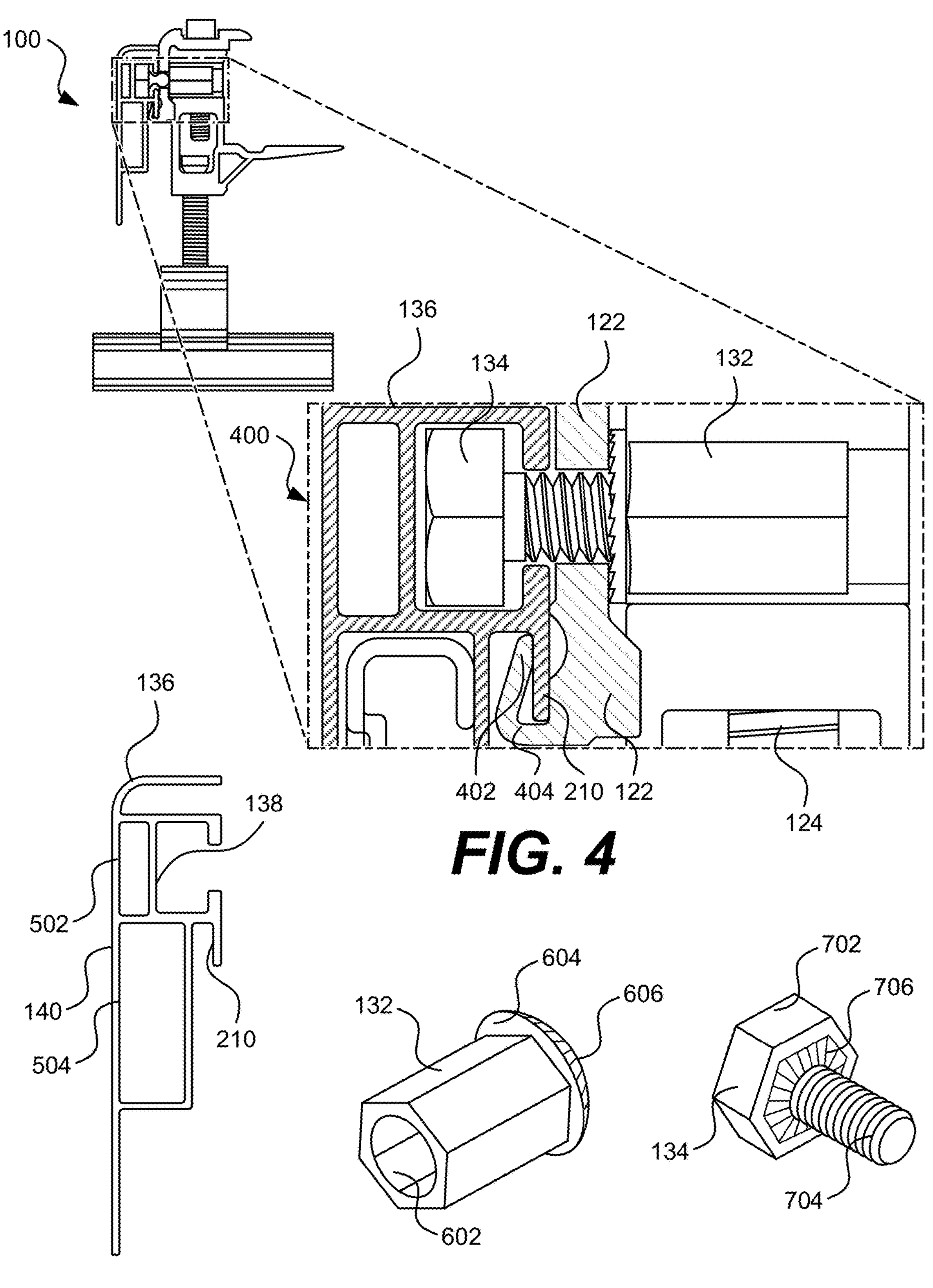
FIG. 4 illustrates a detail view of a trim support and connection system for a clamp assembly, according to an embodiment.
FIG. 5 illustrates a profile for a trim component for attaching to a clamp assembly, according to an embodiment.
FIG. 6 illustrates a nut for connecting a trim component to a clamp assembly, according to an embodiment.
FIG. 7 illustrates a bolt for connecting a trim component to a clamp assembly, according to an embodiment.

The trim component 136 may be held in place by the bolt 134 slid into the T-slot of the trim component and secured to the vertical component 128 by the nut 132. The bolt 134 and nut 132 are depicted in FIGS. 6-7 herein. In particular, the vertical component 128 includes a receiver 208 to slidably receive and support a flange 210 of the trim component 136. The receiver 208 includes an extension that protrudes from the vertical component 128 substantially perpendicular to the vertical component for a first distance and then parallel with the vertical component 128 for a second distance. The receiver 208 therefore defines a slot for receiving the flange 210 of the trim component. When the trim component 136 is installed, the flange 210 is inserted into the receiver 208 which supports the trim component 136 while the installer secures the trim component 136 using the bolt 134 and nut 132. The trim component 136 is therefore secured in place by the threaded connector of the bolt 134 and nut 132 as well as the receiver 208 and flange 210. Additionally, the trim component 136 being held in place by the receiver 208 provides an alignment feature for the clamp assembly 100 with other components of the mounting system. In this manner, the trim component 136 may be used to rapidly and efficiently align the components of the mount system.

FIG. 4 illustrates a detail view 400 of a trim support and connection system for a clamp assembly 100, according to an embodiment. The trip support and connection system includes a receiver 208 that has a vertical component 402 and a horizontal component 404. The horizontal component 404 extends from the surface of the vertical component 128 and the vertical component 402 extends roughly parallel with the vertical component 128. In an embodiment, the vertical component 402 is angled from the distal end of the horizontal component 404 towards the vertical component 128 to form the receiver 208. Accordingly, the flange 210 may be received in the receiver 208 to securely connect the trim component 136.

FIG. 5 illustrates a profile for a trim component 136 for attaching to a clamp assembly, according to an embodiment. The profile shown in FIG. 5 is an example of an extruded trim profile. The trim component 136 includes a channel 138 such as a T-slot, fascia 140, and flange 210 as previously described. The trim component 136 also includes extruded passages 502 and 504 that may provide strength and rigidity to the trim component 136 as opposed to a trim component only having a fascia 140.

FIG. 6 illustrates a nut 132 for connecting a trim component to a clamp assembly, according to an embodiment.

The nut 132, may be a custom nut that includes a threaded passage 602 for receiving a threaded portion of the bolt 134, shown and described with respect to FIG. 7. The nut 132 also includes a flange 604 having ridges 606 on a surface thereof. The flange 604 and ridges 606 may contact an inner surface of the vertical component 128 of the top clamp 122. The flange 604 and ridges 606 may resist removal of the nut 132 similar to a self-locking nut.

FIG. 7 illustrates a bolt 134 for connecting a trim component to a clamp assembly, according to an embodiment. The bolt 134 includes a head 702 that fits within the channel 138 and also includes a threaded portion 704 and ridges 706. The threaded portion 704 interfaces with the nut 132 to secure the trim component 136 to the top clamp 122. The ridges 706 prevent loosening of the bolt and nut over time, similar to a self-locking bolt.

Figures 8, 9:
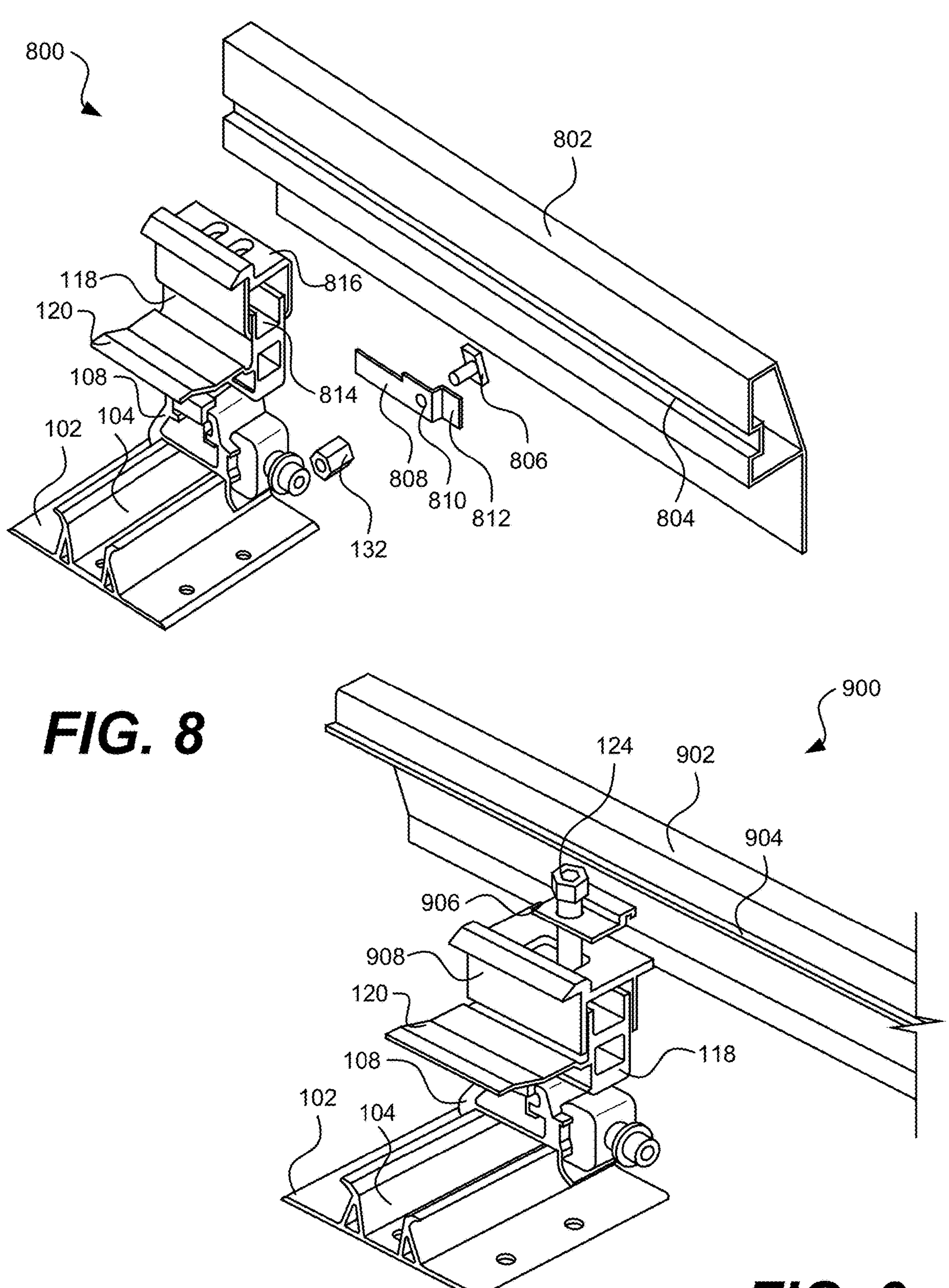
FIG. 8 illustrates a clamp assembly for mounting a solar module to a structure that includes a side-mount connection for a trim component, according to an embodiment.
FIG. 9 illustrates a clamp assembly for mounting a solar module to a structure that includes a top-mount connection for a trim component, according to an embodiment.

FIG. 8 illustrates a clamp assembly 800 for mounting a solar module to a structure that includes a side-mount connection for a trim component, according to an embodiment. The clamp assembly 800 includes the attachment 102, flange 104, base 108, bottom clamp 118, panel support 120, and nut 132 as described herein. The clamp assembly further shows a trim component 802 with a channel 804 such as a T-slot for a bolt 806 similar or identical to the bolt 134 described with respect to FIG. 7. The trim component 802 of clamp assembly 800 is connected using a strip 808 that interfaces with a top clamp 816 and the bottom clamp 118. The strip 808 defines an opening 810 that the bolt 806 passes through and includes an end portion 812 that abuts an edge of the top clamp 816 when the trim component 802 is installed. To install the trim component 802, the bolt 806 is fit within the channel 804 and the strip 808 is placed adjacent the top clamp 816 and the bolt 806 passes through the top clamp 816 and strip 808 before being secured with the nut 132. The nut 132 rests in an opening 814 between the bottom clamp 118 and the top clamp 816.

The top clamp 816 as shown in FIG. 8 does not extend beyond the bottom clamp 118 to create the space for attachment as shown and described herein. The top clamp 816 receives the strip 808 in a receiver, such as the receiver 208 described above.

FIG. 9 illustrates a clamp assembly 900 for mounting a solar module to a structure that includes a top-mount connection for a trim component, according to an embodiment. The clamp assembly 900 includes an attachment 102, flange 104, base 108, bottom clamp 118, panel support 120, and threaded connector 124 as described herein. The clamp assembly 900 further includes a trim component 902 that is top-mounted to the top clamp 908.

The trim component 902 includes a lip 904 that is received and retained by a cap plate 906. The cap plate connects to the top clamp 908 through the threaded connector 124 and an edge of the cap plate 906 sandwiches the lip 904 between the cap plate 906 and the top clamp 908.

Figure 10:
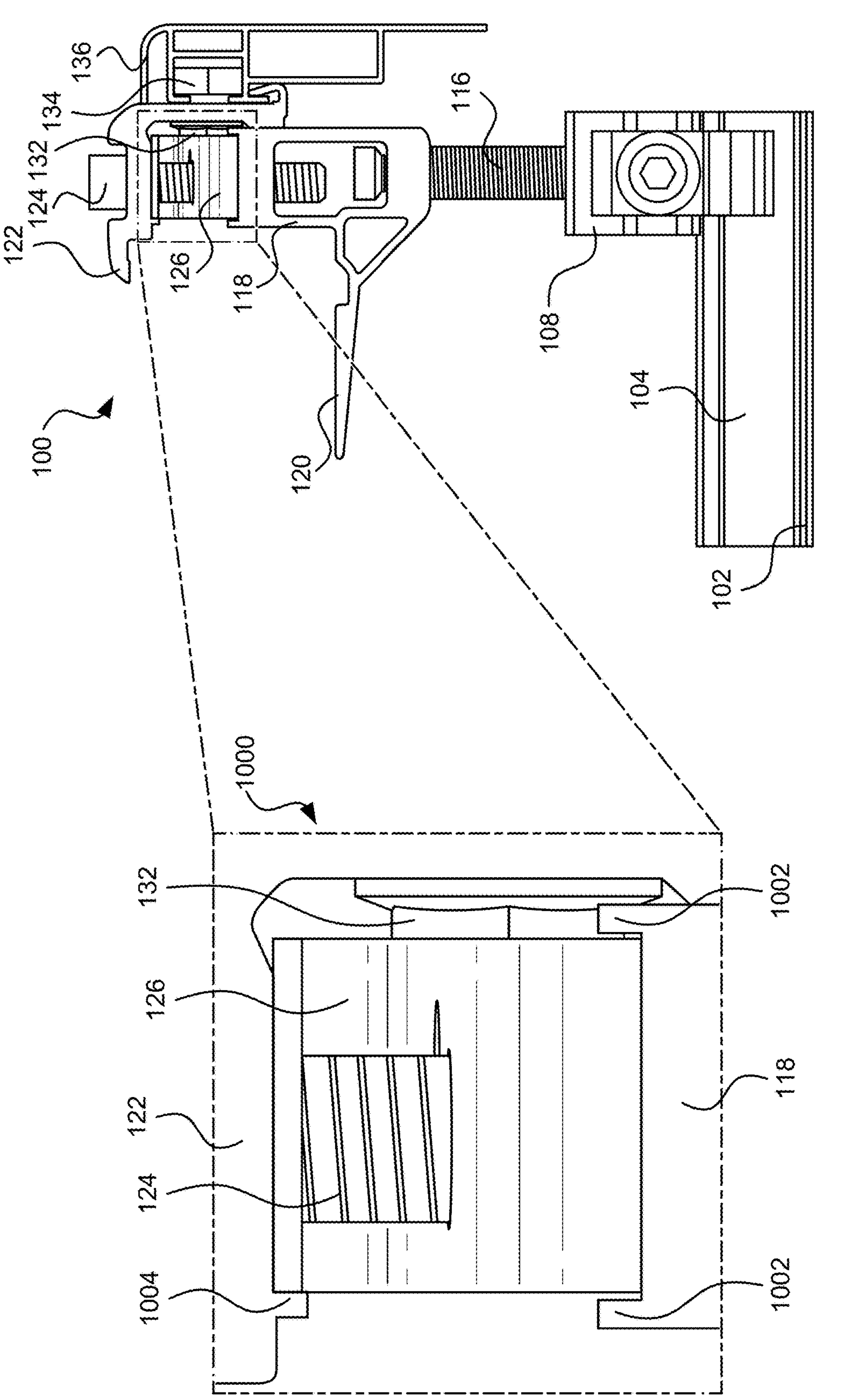
FIG. 10 illustrates a clamp assembly for mounting a solar module to a structure including a detail view of alignment features to maintain an orientation of a spring for the clamp, according to an embodiment.

FIG. 10 illustrates a clamp assembly 100 for mounting a solar module to a structure including a detail view 1000 of alignment features to maintain an orientation of a spring 126 for the clamp, according to an embodiment. In the detail view 1000, the top clamp 122 and the bottom clamp 118 define retainers 1002 and retainers 1004 that maintain the orientation of the spring 126 between the top clamp 122 and the bottom clamp 118. The retainers 1002 and retainers 1004 extend from the surfaces of the bottom clamp 118 and the top clamp 122, respectively. The retainers 1002 and retainers 1004 provide edges for the spring 126, such as a leaf spring or leaf-style spring to remain aligned with the bottom clamp 118 and the top clamp 122 during tightening of the threaded connector 124 and therefore ensuring the spring 126 remains engaged.

Figures 11, 12:
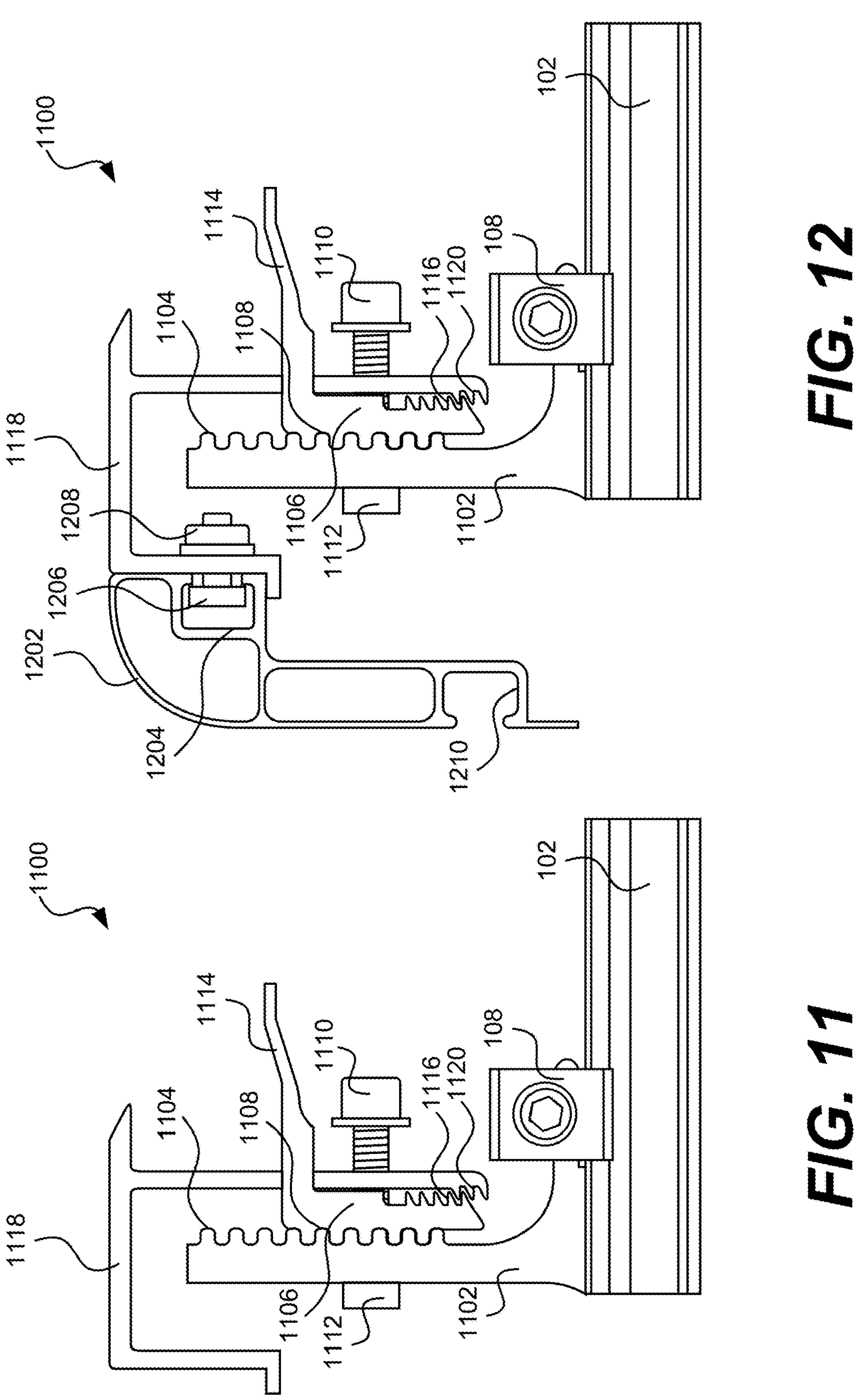
FIG. 11 illustrates a spring-based clamp assembly for mounting a solar module to a structure, according to an embodiment.
FIG. 12 illustrates a spring-based clamp assembly for mounting a solar module to a structure including a trim component, according to an embodiment.

FIG. 11 illustrates a spring-based clamp assembly 1100 for mounting a solar module to a structure, according to an embodiment. The spring-based clamp assembly 1100 includes an attachment 102 and base 108 similar or identical to those described above with respect to FIG. 1. The spring-based clamp assembly 1100 includes a vertical leg 1102, protrusions 1104, bottom clamp 1106, protrusions 1108, bolt 1110, nut 1112, ledge 1114, teeth 1116, top clamp 1118, and teeth 1120.

The vertical leg 1102 extends from the base 108 vertically away from the attachment 102. The vertical leg 1102 and bottom clamp are positionable relative to one another through the use of the protrusions 1104 and protrusions 1108. The protrusions 1104 and protrusions 1108 mate together and enable positioning of the bottom clamp 1106 at varying heights along the vertical leg 1102. The bolt 1110 and nut 1112 secure (with a spring between the head of the bolt 1110 and the top clamp 1118) the vertical leg 1102 and the bottom clamp 1106 together. The teeth 1116 and teeth 1120 similarly interact to enable positioning of the top clamp 1118 relative to the bottom clamp 1106. In this manner, the clamp between the ledge 1114 and the top clamp 1118 is adjustable to securely clamp about a solar panel module.

FIG. 12 illustrates a spring-based clamp assembly 1100 for mounting a solar module to a structure including a trim component, according to an embodiment. The spring-based clamp assembly 1100 includes a trim component 1202 with a channel 1204 to secure to the top clamp 1118 with a bold 1206 and nut 1208. The trim component 1202 further includes an exterior channel 1210 that may be used to secure additional components to the trim component 1202.

Figures 13, 14:
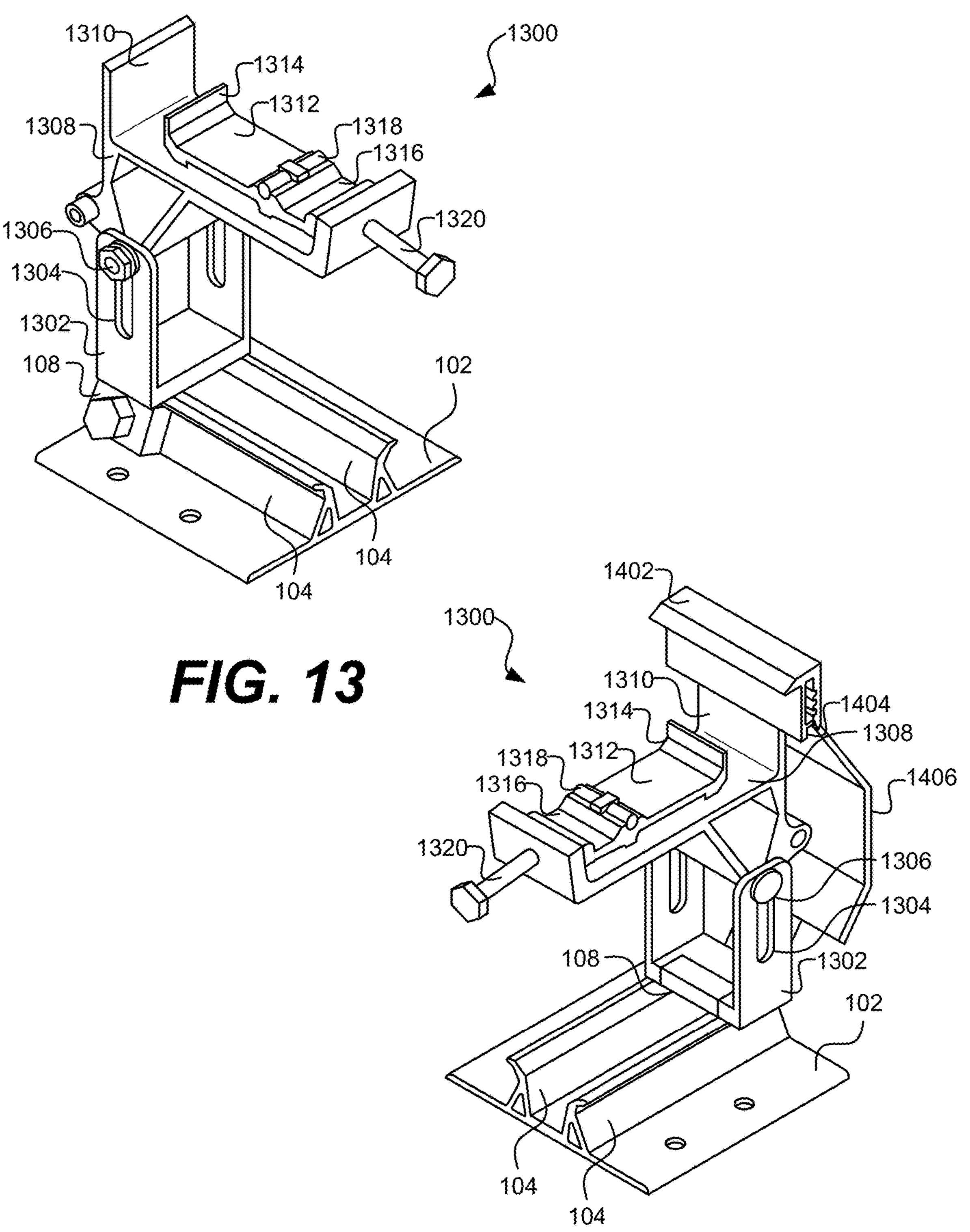
FIG. 13 illustrates a clamp assembly for mounting a solar module to a structure using a hidden clamp, according to an embodiment.
FIG. 14 illustrates a clamp assembly for mounting a solar module to a structure using a hidden clamp with a trim component attached, according to an embodiment.

FIGS. 13 and 14 illustrate a clamp assembly 1300 for mounting a solar module to a structure using a hidden clamp, according to an embodiment. The clamp assembly 1300 includes an attachment 102 and flanges 104, as well as a base 108 as described herein. The clamp assembly 1300 further includes vertical support 1302 defining an elongated opening 1304. The clamp assembly 1300 further includes an upper component 1308 that includes a flange 1310. The upper component 1308 couples with the vertical support 1302 through a bolt and nut 1306 that may be loosened to adjust a height of the upper component 1308 relative to the vertical support 1302.

The upper component 1308 includes an upper clamp 1312 with a clamp surface 1314 and a lower clamp 1316 connected through a hinge 1318. The lower clamp 1316 is actuated by a bolt 1320. Actuating the lower clamp 1316 results in relative movement of the upper clamp 1312 until the clamp surface 1314 and lower clamp 1316 close around an edge of a solar module.

The clamp assembly 1300 depicted in FIG. 14 includes a trim component 1402 connected to the flange 1310. The trim component 1402 includes a channel 1404 with protrusions that flexes to accept the flange 1310 and secures the trim component 1402 to the upper component 1308. The trim component 1402 further includes a trim fascia 1406 that protrudes outwards to enclose the clamp assembly 1300.

The configuration of the clamp assembly described herein is optimized to simplify the installation process, requiring only a single tool—a wrench—to securely attach a solar panel module to the clamp assembly described herein. Such a configuration is particularly valuable in real-world applications, as solar panel module systems are often installed on rooftops at high elevations, where carrying and handling multiple tools can be cumbersome and potentially hazardous.

The ability to perform the entire installation with just one tool not only streamlines the assembly process but also enhances the safety of the personnel involved. By minimizing the tools needed, the risk of dropping tools from height or losing grip during installation is reduced, contributing to a safer and more efficient installation process. This thoughtful design consideration underscores the practical advantages of the clamp assembly in challenging installation environments, ensuring both ease of use and secure attachment of the solar panel modules.

While the foregoing invention is described with respect to the specific embodiments and examples, it is to be understood that the scope of the invention is not limited to these specific examples. Since other modifications and changes varied to fit particular operating requirements and environments will be apparent to those skilled in the art, the invention is not considered limited to the example chosen for purposes of disclosure and covers all changes and modifications which do not constitute departures from the true spirit and scope of this invention.

What is claimed is:

1. A mounting system for mounting a solar panel module, the mounting system comprising:
- an attachment including a connection interface extending along a length of the attachment;
- a base configured to connect to the connection interface;
- a vertical support coupled to the base;
- a top clamp positionable along a height of the vertical support, the top clamp including first alignment features, the top clamp and bottom clamp configured to releasably secure an edge of the solar panel module;
- a bottom clamp connected to and positionable along a height of the vertical support and including second alignment features; and
- a compression spring positioned between the bottom clamp and the top clamp, the compression spring configured to apply a force in a first direction and having a body extending in a second direction substantially perpendicular to the first direction and wherein the first alignment features and the second alignment features maintain the compression spring in an orientation.

2. The mounting system of claim 1, wherein the top clamp includes a top ledge positioned on a first side of the top clamp, the top ledge configured to rest against a top edge of a frame of the solar panel module.

3. The mounting system of claim 2, wherein the top clamp further includes a vertical component positioned on a second side opposite the first side, the vertical component including a trim connection interface configured to receive a securing device of a trim component.

4. The mounting system of claim 3, wherein the trim connection interface includes a passage defined in the vertical component to receive a bolt couplable to the trim component and securable to the trim connection interface by a nut.

5. The mounting system of claim 1, wherein the bottom clamp further includes a panel support ledge configured to support a bottom edge of a frame of the solar panel module.

6. The mounting system of claim 1, wherein the base includes a first protrusion and a second protrusion configured to engage the connection interface.

7. The mounting system of claim 1, wherein the top clamp includes a receiver configured to slidably receive and support a flange of a trim component, the receiver including an extension that protrudes from a vertical component of the top clamp substantially perpendicular to the vertical component for a first distance and then parallel with the vertical component for a second distance.

8. The mounting system of claim 1, wherein the compression spring includes a leaf spring.

9. A mounting system for mounting a solar panel module, comprising:
- a plurality of attachments; and
- a plurality of clamp assemblies attached to the plurality of attachments, wherein a clamp assembly of the plurality of clamp assemblies includes:
  - a base configured to connect one of the plurality of attachments;
  - a vertical support coupled to the base;
  - a bottom clamp connected to and positionable along a height of the vertical support;
  - a top clamp positionable relative to the bottom clamp along a direction parallel with the height of the vertical support, the top clamp and bottom clamp configured to releasably secure an edge of the solar panel module adjacent a first side of the clamp assembly, the top clamp including a trim connection interface configured to receive a connection component; and
  - a spring configured to bias positioning of the top clamp relative to the bottom clamp.

10. The mounting system of claim 9, wherein the bottom clamp includes a panel support ledge that extends in a first direction substantially perpendicular to the vertical support.

11. The mounting system of claim 10, wherein the top clamp includes a top support ledge that extends in the first direction.

12. The mounting system of claim 9, further comprising a trim component including an extruded attachment couplable to the connection component, wherein the connection component includes a fastener having a component configured to fit within a channel of the extruded attachment.

13. The mounting system of claim 9, wherein the top clamp includes a first extruded attachment including:
- an upper attachment including a top support ledge, and wherein the spring is positioned between the bottom clamp and the upper attachment; and
- a side attachment extending substantially perpendicular to the upper attachment and defining a passage configured to receive a bolt couplable to a trim component.

14. The mounting system of claim 13, wherein the side attachment includes a trim support, the trim support including a clip configured to receive a portion of a trim component and support the trim component adjacent a second side of the clamp assembly.

15. The mounting system of claim 9, wherein the top clamp includes a trim interface, the mounting system further including:
- a trim component configured to connect to the trim interface and position the trim component adjacent a second side of the clamp assembly, the second side opposite the first side.

16. The mounting system of claim 9, wherein the vertical support includes a height adjustment component configured to enable adjustment of a distance between the base and the bottom clamp.

17. The mounting system of claim 9, wherein the top clamp is secured to the bottom clamp through an interface including:

one or more first teeth on a first surface of the bottom clamp;

one or more second teeth on a second surface of the top clamp; and a connector configured to pass through the first surface and the second surface, wherein the spring contacts the connector and is configured to bias the one or more first teeth into engagement with the one or more second teeth.

18. The mounting system of claim 9, wherein the base further includes inwardly-extending, tapered flanges formed at distal edges of first and second sides of the base, the tapered flanges configured to engage sidewalls of one of the plurality of attachments when the base is mounted on and rotated against the one of the plurality of attachments.

19. The mounting system of claim 9, wherein the bottom clamp includes a channel defined within a panel support ledge, the channel configured to interface with an edge of a frame of the solar panel module.

20. A method of mounting a solar panel module to a structure via a clamp assembly, the clamp assembly comprising:

a base;

a vertical support coupled to the base;

a bottom clamp connected to and positionable along a height of the vertical support;

a top clamp positionable relative to the bottom clamp along a direction parallel with the height of the vertical support, the top clamp and bottom clamp configured to releasably secure an edge of the solar panel module adjacent a first side of the clamp assembly; and a spring configured to bias positioning of the top clamp relative to the bottom clamp, the method comprising:

connecting the base to an attachment connected to the structure;

placing a frame of the solar panel module on the bottom clamp adjacent a first side of the clamp assembly; and securing the top clamp against the frame of the solar panel module by positioning the top clamp relative to the bottom clamp; and connecting a trim component to the top clamp through a trim interface, the trim component positioned adjacent a second side of the clamp assembly.

* * * * *